United States Patent
Trainer et al.

(10) Patent No.: US 12,304,315 B2
(45) Date of Patent: May 20, 2025

(54) ELECTRICAL CONVERTER

(71) Applicant: ROLLS-ROYCE plc, London (GB)

(72) Inventors: David R. Trainer, Derby (GB);
Francisco Javier Chivite Zabalza, Stafford (GB); Mark Sweet, Chesterfield (GB)

(73) Assignee: Rolls-Royce plc

(*) Notice: Subject to any disclaimer, the term of this patent is extended or adjusted under 35 U.S.C. 154(b) by 231 days.

(21) Appl. No.: 17/968,254

(22) Filed: Oct. 18, 2022

(65) Prior Publication Data
US 2023/0133771 A1    May 4, 2023

(30) Foreign Application Priority Data

Nov. 2, 2021 (GB) .................................. 2115686

(51) Int. Cl.
*H02H 3/00* (2006.01)
*B60L 15/00* (2006.01)
(Continued)

(52) U.S. Cl.
CPC ........... *B60L 15/007* (2013.01); *H02M 3/158* (2013.01); *H02M 5/458* (2013.01);
(Continued)

(58) Field of Classification Search
CPC ...... B60L 15/007; H02M 3/158; H02M 5/458
(Continued)

(56) References Cited

U.S. PATENT DOCUMENTS

2007/0248861 A1* 10/2007 Hoshi ................ H01M 16/006
                                                                    429/513
2015/0021983 A1*  1/2015 Karimi ............... H02M 1/0043
                                                                    307/31
(Continued)

FOREIGN PATENT DOCUMENTS

CN      207743878 U    8/2018
DE    102016201986 A1  8/2017
(Continued)

OTHER PUBLICATIONS

Great Britain search report dated Apr. 21, 2022, issued in GB Patent Application No. 2115686.4.
(Continued)

*Primary Examiner* — Jared Fureman
*Assistant Examiner* — Lucy M Thomas
(74) *Attorney, Agent, or Firm* — Barnes & Thornburg

(57) ABSTRACT

The disclosure relates to electrical converters for use in aircraft electrical power systems and to methods of operating such electrical converters to maintain reliable operation of semiconductor components over varying cosmic radiation levels at altitude. Exemplary embodiments include an electrical converter comprising: a converter circuit having a plurality of semiconductor devices configured to convert an input electrical supply to an output electrical supply; and a controller connected configured to receive an input altitude signal, wherein the controller is further configured to control a temperature of the plurality of semiconductor devices according to the received input altitude signal to reduce an effect of increased incident cosmic radiation on the converter circuit.

17 Claims, 8 Drawing Sheets

(51) Int. Cl.
    *H02M 3/158*     (2006.01)
    *H02M 5/458*     (2006.01)

(52) U.S. Cl.
    CPC ....... *B60L 2200/10* (2013.01); *B64D 2221/00* (2013.01); *H02J 2310/44* (2020.01)

(58) Field of Classification Search
    USPC .......................................................... 361/44
    See application file for complete search history.

(56) References Cited

U.S. PATENT DOCUMENTS

| | | | |
|---|---|---|---|
| 2020/0021102 A1* | 1/2020 | Kim | H02H 1/0007 |
| 2020/0292051 A1* | 9/2020 | Choi | F16H 57/0413 |

FOREIGN PATENT DOCUMENTS

| | | | |
|---|---|---|---|
| EP | 3595150 A2 | 1/2020 | |
| JP | 2013005067 A | 1/2013 | |

OTHER PUBLICATIONS

European search report dated Mar. 23, 2023, issued in EP Patent Application No. 22199329.8.

Harikumaran, et al., "Reliability oriented thermal management of aircraft power converters", 2020 IEEE 9th International Power Electronics and Motion Control Conference (IPEMC2020-ECCE Asia), IEEE, Nov. 29, 2020, pp. 1590-1594.

Office Action for application 22 199 329.8-1002, dated Jun. 2, 2025, 7 pages.

\* cited by examiner

INCREASING CONDUCTION LOSSES

ELECTRICAL CONVERTER

CROSS-REFERENCE TO RELATED APPLICATIONS

This specification is based upon and claims the benefit of priority from United Kingdom Patent Application No. 2115686.4, filed on 2 Nov. 2021, the entire contents of which are incorporated herein by reference.

BACKGROUND

Technical Field

This disclosure relates to electrical converters for use in aircraft electrical power systems and to methods of operating such electrical converters to maintain reliable operation of semiconductor components over varying cosmic radiation levels at altitude.

Description of the Related Art

The use of electrical power and electrically powered propulsion for aircraft is expected to increase, mainly due to an increased desire to reduce, or at least displace, carbon dioxide emissions. Energy storage using batteries can provide electric power without combustion of aviation fuel, but typically only for short periods due to the increased weight of battery storage. Advanced hybrid systems, as well as so-called 'more electric' aircraft systems, are therefore expected to become more widely used while battery storage remains a significant problem, particularly for anything above small scale short distance flight. Architectures to enable hybrid propulsion require rotating generators in combination with AC and DC electrical distribution networks to supply electrical power to variable speed electrical propulsion motors.

Electronic power converters using high power semiconductors are required to convert electrical power from AC to DC, DC to DC and DC to AC. High power semiconductors are also used in protection devices such as solid state circuit breakers and solid state power controllers.

A problem with the use of semiconductor devices in aerospace applications is the effect of cosmic radiation when operating at altitude. Cosmic rays can lead to an internal cascade avalanche type breakdown and possible failure of a semiconductor device. It is known that radiation from cosmic rays increases with altitude, reaching a maximum (known as the Pfotzer maximum) at around 60,000 to 80,000 feet (around 18,300 to 24,400 m) of around 4.1 µSv/hr, which is around 80 times that at sea level. This effect may lead to problems in aviation power electronics in use at altitude, potentially limiting their application or requiring the amount of power such electronics are capable of handling at altitude to be limited. Conventional practice is to de-rate the operating voltage to reduce the probability of failure to maintain overall reliability. This, however, restricts the amount of power such electronics can handle.

It is an object to address the above-mentioned problems.

SUMMARY

In accordance with a first aspect there is provided an electrical converter comprising: a converter circuit having a plurality of semiconductor devices configured to convert an input electrical supply to an output electrical supply; and a controller configured to receive an input altitude signal, wherein the controller is further configured to control a temperature of the plurality of semiconductor devices according to the received input altitude signal.

An increase in temperature for a semiconductor device will tend to reduce a failure rate due to cosmic radiation at a given altitude, thereby enabling the electrical converter to continue to operate in an environment with increased exposure to cosmic radiation without necessarily needing to be de-rated. The controller is therefore configured to increase the temperature of the plurality of semiconductor devices with increasing altitude, which corresponds to increasing cosmic radiation. The temperature of each semiconductor device may be controlled in one or more ways.

The controller may be connected to the converter circuit and be configured to control a switching operation of the plurality of semiconductor devices. The controller may be further configured to adjust the switching operation of each of the plurality of semiconductor devices according to the received input altitude signal to control a temperature of each of the plurality of semiconductor devices.

The switching operation controlled by the controller may for example be a switching rate of each of the semiconductor devices, i.e. the rate at which each semiconductor device switches between states (e.g. open and closed). The controller may be configured to decrease the switching rate with increasing altitude so that switching losses increase, thereby increasing the temperature of each semiconductor device. Where the semiconductor devices comprise transistors, the switching rate of each transistor may be controlled by adjusting a resistance connected in series with a gate of each transistor.

The switching operation controlled by the controller may for example be a switching frequency of the semiconductor devices, in which the controller is configured to increase the switching frequency with increasing altitude so that losses increase, thereby increasing the temperature of each semiconductor device.

The controller may be configured to operate under voltage control, in which an input voltage demand signal and a measured output voltage signal from the output electrical supply are provided to the controller and the controller operates the electrical converter to minimise a difference between the input voltage demand signal and the measured output voltage signal. A correction factor signal may also be input to the controller, the correction factor being dependent on the input altitude signal to reduce the voltage applied to the semiconductor devices as the altitude increases.

The controller may be configured to control the temperature of each of the plurality of semiconductor devices by adjusting thermal management of the electrical converter dependent on the input altitude signal. Thermal management may be adjusted for example by adjusting a flow rate of a cooling or heating fluid flowing through a heat exchanger connected to the electrical converter. Other thermal management systems, for example forced air devices such as fans, may be used and have their operations (e.g. speeds) adjusted.

The converter circuit may be one of an AC to DC converter, a DC to DC converter and a DC to AC converter.

The temperature of may be a junction temperature of the semiconductor devices.

In accordance with a second aspect there is provided a method of controlling an electrical converter for an aircraft electrical power system, the electrical converter comprising a converter circuit having a plurality of semiconductor devices configured to convert an input electrical supply to an output electrical supply and a controller, the method comprising: the controller receiving an input altitude signal and controlling a temperature of the plurality of semiconductor devices according to the received input altitude signal.

The controller may be connected to the converter circuit and control a switching operation of the plurality of semiconductor devices. The controller may adjust a switching operation of each of the plurality of semiconductor devices according to the received input altitude signal to control a temperature of each of the plurality of semiconductor devices.

The controller may control the switching operation by controlling a rate at which each semiconductor device switches between states.

The plurality of semiconductor devices may comprise a plurality of transistors and the controller may control the switching operation of each transistor by adjusting a gate resistance of each transistor.

The controller may control the switching operation by adjusting a switching frequency of the semiconductor devices according to the received input altitude signal.

The controller may receive a control signal of a difference between an input voltage demand signal and a measured output voltage of the converter circuit.

The controller may control a temperature of each of the plurality of semiconductor devices by adjusting thermal management of the electrical converter dependent on the received input altitude signal.

The electrical converter may comprise a heat exchanger connected to the converter circuit and the controller may adjust a flow rate of a cooling or heating fluid flowing through the heat exchanger. Additionally or alternatively, the electrical converter may comprise or be coupled to another thermal management system, for example on or more forced air devices such as fans. Operation of the such systems may be adjusted.

The converter circuit may be one of an AC to DC converter, a DC to DC converter and a DC to AC converter.

The temperature of may be a junction temperature of the semiconductor devices.

In accordance with a third aspect there is provided an aircraft electrical power system comprising: a converter circuit with a plurality of semiconductor devices; and a controller configured to operate the converter circuit by controlling a switching operation of each of the semiconductor devices, the converter circuit being configured to convert an input voltage supply to an output voltage supply, wherein the controller is configured to control the switching operation to reduce an effect of increased incident cosmic radiation on the converter circuit by controlling the output voltage supply dependent on an input altitude signal such that the output voltage supply is reduced as the incident cosmic radiation increases.

In accordance with a fourth aspect there is provided a method of controlling an aircraft electrical power system to reduce an effect of increased incident cosmic radiation on a converter circuit of the aircraft electrical power system, the system comprising a converter circuit with a plurality of semiconductor devices and a controller configured to operate the converter circuit by controlling a switching operation of each of the semiconductor devices, the converter circuit being configured to convert an input voltage supply to an output voltage supply, the method comprising: the controller receiving an input altitude signal and, responsive to the input altitude signal, controlling the switching operation of each of the semiconductor devices such that the output voltage supply is reduced as the incident cosmic radiation increases.

The input altitude signal is correlated with a level of cosmic radiation. Reducing the output voltage supply as the input altitude signal increases thereby reduces an effect of the increased cosmic radiation on the semiconductor devices, which can maintain a desired level of reliability of the semiconductor devices with varying levels of cosmic radiation.

The controller of any of the above aspects may be implemented as a single controller or multiple separate (e.g. distributed) controllers. Thus, the controller may be or may form part of a control system. The controller may be implemented in software, hardware or a combination of the two. The controller may be or may be a functional module of an Engine Electronic Controller (EEC) or a Full Authority Digital Engine Controller (FADEC).

The skilled person will appreciate that except where mutually exclusive, a feature described in relation to any one of the above aspects may be applied mutatis mutandis to any other aspect. Furthermore. except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
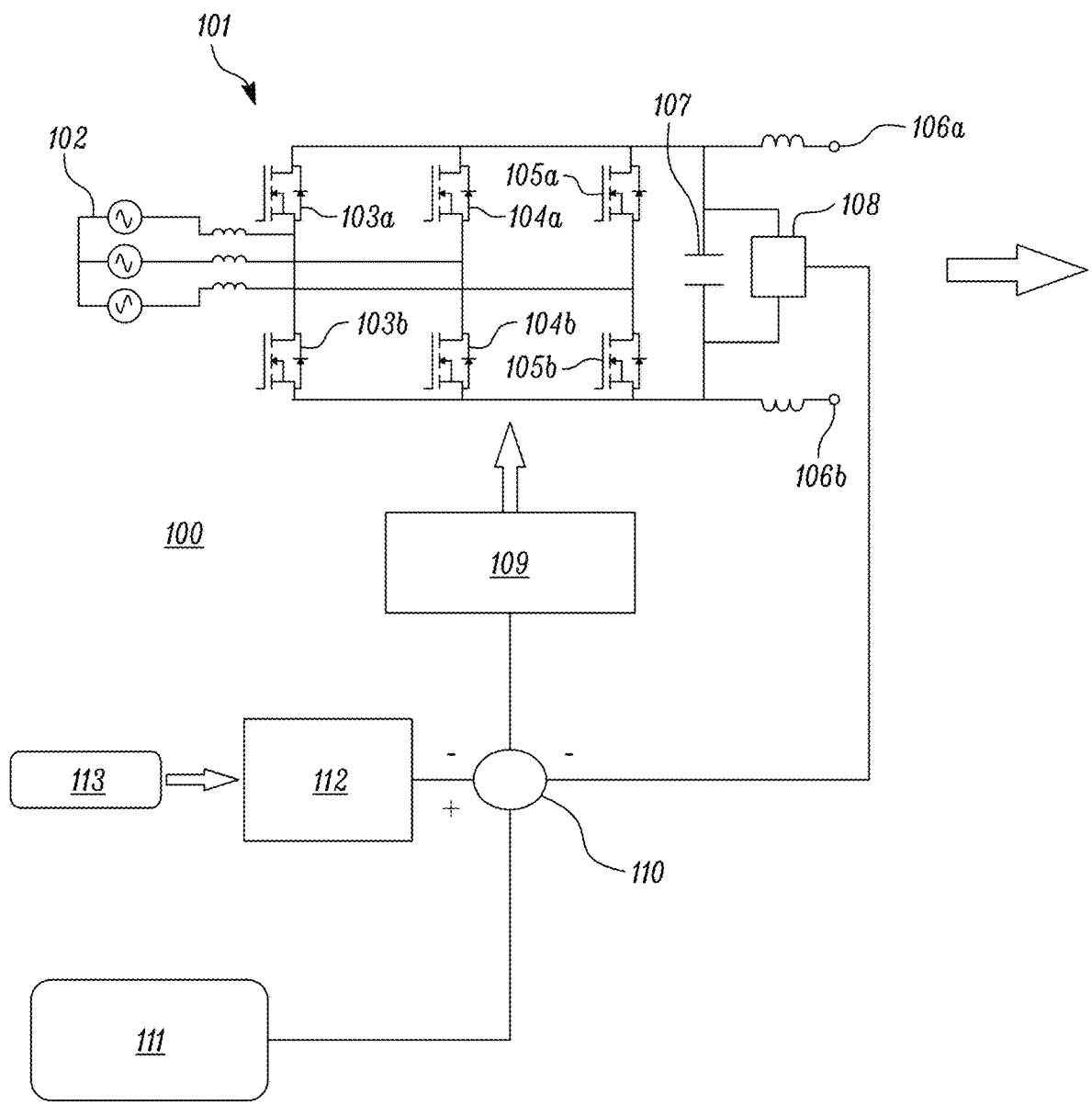
FIG. 1 is a schematic diagram of an example AC to DC electrical converter with altitude-dependent voltage control.

FIG. 1 illustrates schematically an example system 100 comprising an AC to DC converter 101 with altitude-dependent voltage control. The converter 101 is connected to a three phase AC input generator 102 and comprises a pair of semiconductor devices 103*a,b*, 104*a,b*, 105*a,b* connected to each phase. Output terminals 106*a*, 106*b* of the converter 101 provide a DC supply, which is smoothed by an output capacitor 107. Switching of the semiconductor devices is controlled by a controller 109.

Each of the semiconductor devices 103*a,b*, 104*a,b*, 105*a,b* comprises a MOSFET connected in parallel with a diode, which may be the inherent body diode of the MOSFET and/or a separate component diode connected in parallel. The controller 109 controls switching of each device by applying a gate voltage signal to each MOSFET, the sequence of switching providing the required conversion from the input AC supply 102 to the output DC supply 106*a,b*. Switching sequences for AC to DC converters are well known, as are corresponding switching sequences and converters for DC to AC and DC to DC converters. The AC to DC converter 101 illustrated in FIG. 1 may be replaced by a DC to AC converter or a DC to DC converter.

The output voltage between terminals 106*a*, 106*b* is measured by a voltage sensing circuit 108, which provides a signal to a summing circuit 110. A voltage demand signal is also provided to the summing circuit 110 from a voltage demand input 111, together with a correction factor 112 derived from an altitude signal 113. The correction factor 112 and measured voltage are subtracted by the summing circuit 110 from the voltage demand signal 111 to provide a control input to the controller 109, which provides switching signals to control the semiconductor devices 103*a,b*, 104*a,b*, 105*a,b* to provide the output DC voltage. As the altitude increases, the control input is progressively reduced, reducing the output voltage of the converter 101.

The altitude signal 113 will be correlated to the magnitude of cosmic radiation such that increasing altitude will correlate with increasing cosmic radiation experienced by the system 100. In a general aspect therefore, there is provided an aircraft electrical power system 100 comprising an electrical converter circuit 101 with a plurality of semiconductor devices 103*a,b*, 104*a,b*, 105*a,b* and a controller 109 configured to operate the electrical converter circuit 101 by controlling a switching operation of each of the semiconductor devices, the electrical converter circuit 101 being configured to convert an input voltage supply to an output voltage supply, wherein the controller 109 is configured to control the switching operation to control the output voltage supply dependent on an input altitude signal such that the output voltage supply is reduced as the input altitude signal increases. The electrical converter circuit may be an AC to DC converter circuit, as illustrated for example in FIG. 1, or may be a DC to DC converter circuit or a DC to AC converter circuit.

Figure 2:
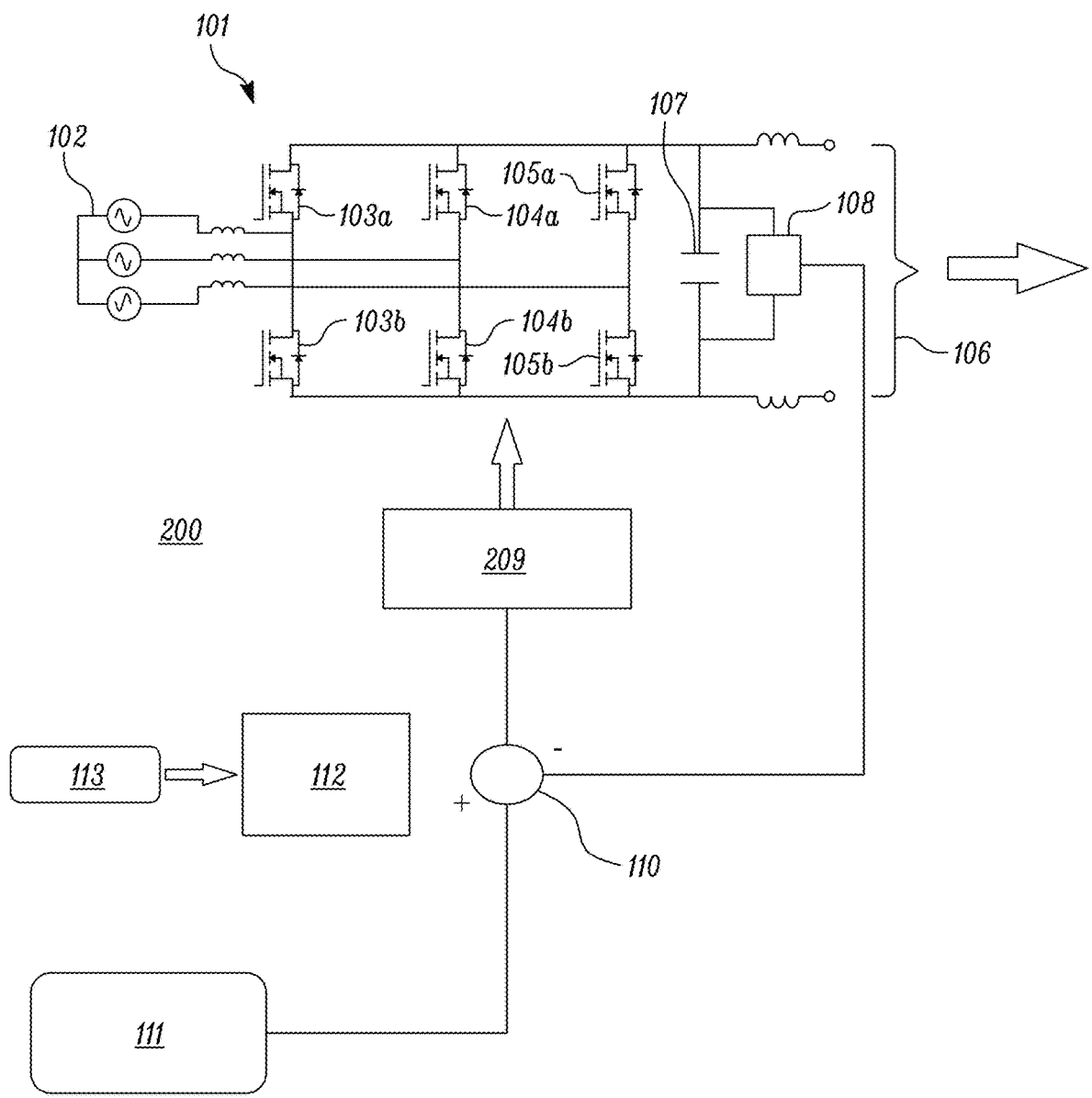
FIG. 2 is a schematic diagram of an example AC to DC electrical converter circuit with an input AC supply provided by a generator.

FIG. 2 illustrates an alternative example system 200 comprising an AC to DC converter 101 similar to that in FIG. 1 with an altitude-dependent controller input. As in FIG. 1, the system comprises a controller 209 for controlling operation of the converter 101, with a control signal being provided to the controller 209 from a voltage demand input 111 and a measured voltage from an output voltage measurement circuit 108. Any difference between these inputs is provided to the controller 209 to cause the controller 209 to adjust operation of the converter 101 to maintain a desired output voltage. The system 200 also comprises an altitude input 113 that generates a correction factor 112, which is also input to the controller 209. In this example, rather than controlling the output voltage with the altitude correction factor, the altitude correction factors causes the controller 209 to adjust operation of the converter 101 to control a temperature of each of the semiconductor devices 103*a,b*, 104*a,b*, 105*a,b*. The output voltage 106 of the converter 101 may be maintained independently of the altitude input 113.

The AC to DC converter 101 in FIG. 2 may be replaced by a DC to AC converter by reversing the converter circuit, with the output 106 being an input DC supply and the AC generators 102 being instead the output AC supply. Switching of the devices may be adjusted accordingly.

Figure 3:
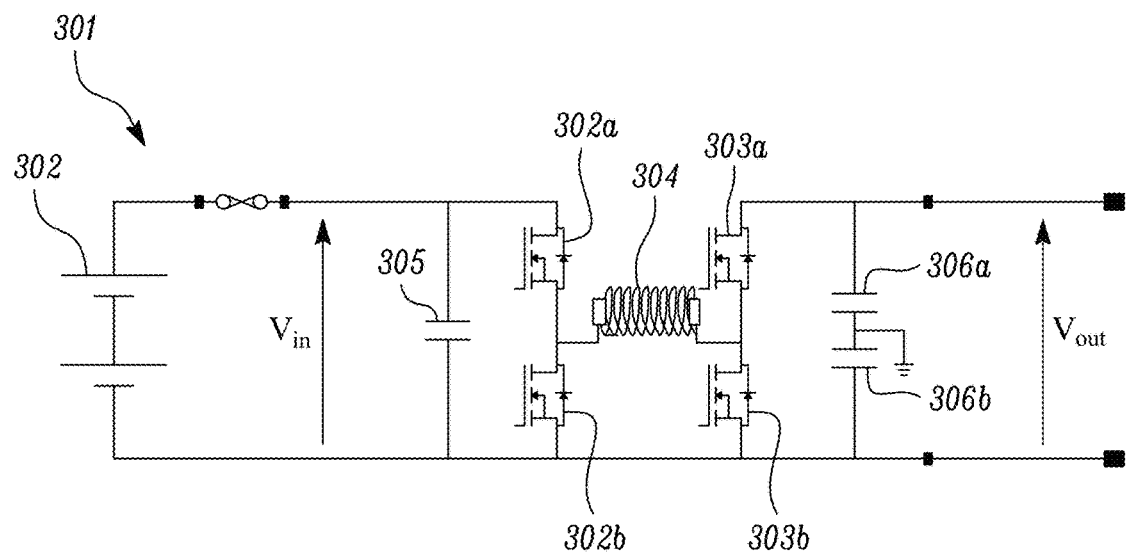
FIG. 3 is a schematic diagram of an example DC to DC electrical converter circuit with an input DC supply provided by an electrical storage device.

FIG. 3 illustrates an alternative converter 301 in the form of a DC to DC converter. The converter 301 takes a DC input voltage supply, for example from an electrical storage device 302 and converts the input DC voltage $V_{in}$ to a different output DC voltage $V_{out}$. The electrical storage device 302 may for example comprise a battery and/or a capacitor. A plurality of semiconductor devices 302*a,b*, 303*a,b* are connected across the input and output supplies with an inductor 304 between an input pair 302*a*, 302*b* of the devices and an output pair 303*a*, 303*b*. Input and output capacitors 305, 306*a,b* are connected respectively across the input and output supplies for smoothing. A pair of output capacitors 306*a*, 306*b* may be connected either side of a ground connection to enable a differential output voltage supply $V_{out}$. Switching of each of the devices may be controlled by a controller in a similar way to that in FIG. 2, with the sequence of switching operations instead converting the DC input supply to the output DC supply.

Operation of the converter 101 to control a temperature of each of the semiconductor devices 103*a,b*, 104*a,b*, 105*a,b* in the example in FIG. 2 or the semiconductor devices 302*a,b*, 303*a,b* in the example in FIG. 3 may be achieved in one or more different ways. The temperature of the semiconductor devices may be controlled directly, for example by controlling heating and cooling of the converter 101. The temperature of the semiconductor devices may alternatively be controlled by adjusting a switching operation of each of the devices. A combination of the two may also be used. The switching operation may be adjusted by adjusting a switching frequency and/or a switching rate of each of the semiconductor devices.

Power electronic converters have internal power losses during operation, which are typically minimised to maximise their efficiency. Such losses result from conduction losses and switching losses, which serve to increase the junction temperature of each device. These losses may be deliberately adjusted by altering how the semiconductor devices are switched so that their temperature may be controlled directly. The switching rate may for example be slowed down, which increases losses during each switching operation, increasing the junction temperature. The switching frequency may alternatively be increased, which increases switching losses and also increases the junction temperature.

Figure 4:
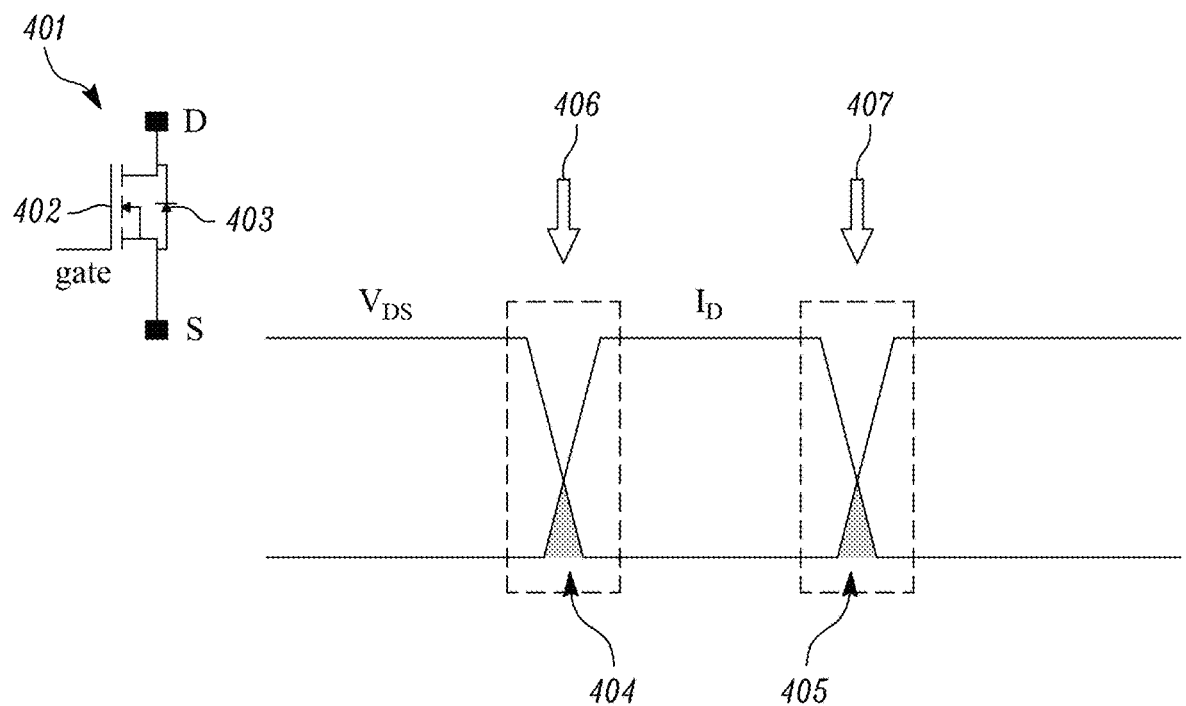
FIG. 4 is a schematic diagram of an example semiconductor device and a switching sequence for the device.

As illustrated in FIG. 4, each semiconductor device 401 may comprise a high power MOSFET 402 connected in parallel with a diode 403, the diode being connected between a drain D and source S of the MOSFET 402. A control signal is provided to the gate of the MOSFET 402 to control switching of current between the drain and source. FIG. 4 illustrates a schematic plot of the drain to source voltage $V_{DS}$ and the drain current $I_D$ over time as the MOSFET is switched on 406 and then off 407. Switching power losses occur during each switching interval, indicated by shaded areas 404, 405. The size of switching losses is dependent on the rate at which the MOSFET is switched between on and off.

Figure 5:
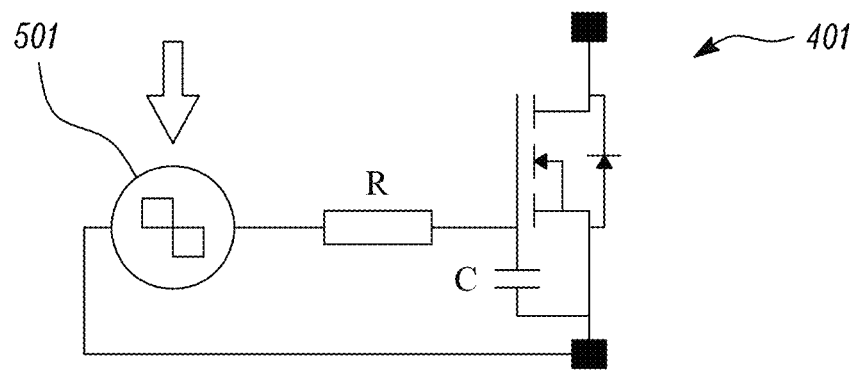
FIG. 5 is a schematic diagram of an example semiconductor device with an adjustable gate resistance and switching sequences illustrating the effect of adjusting the gate resistance on switching losses.
Figure 5:
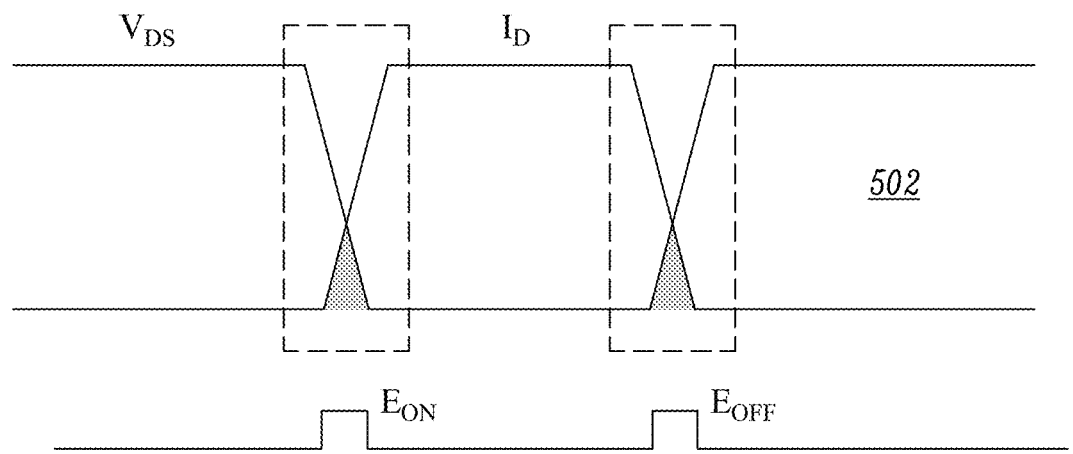
Figure 5:
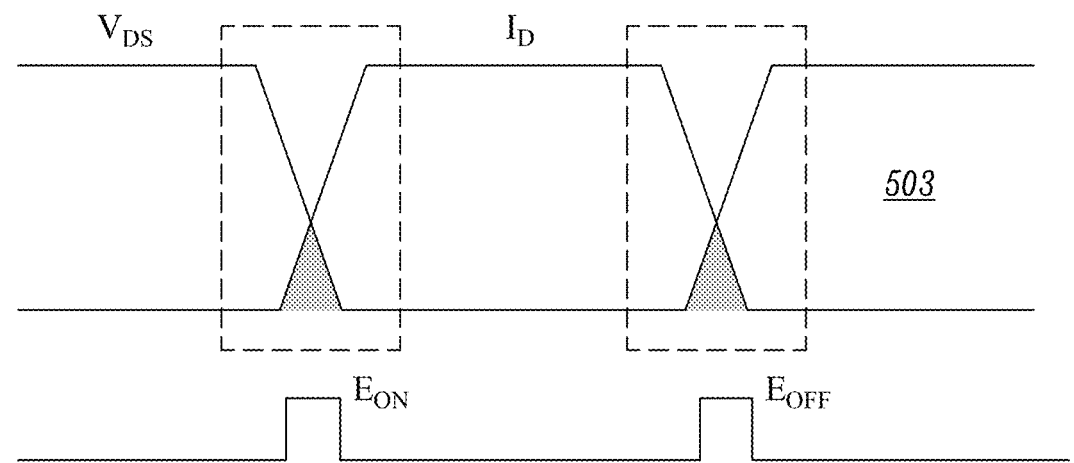

FIG. 5 illustrates a semiconductor device 401 with its associated gate resistance R and gate to source capacitance C. The values of R and C are typically characteristic of the MOSFET and determine the rate at which the MOSFET is capable of switching, with higher values for either R or C resulting in a slower switching rate. A switching signal 501 is provided to the gate of the MOSFET, resulting in the switching behaviour shown in FIG. 4. The plots of $V_{DS}$ and $I_D$ over time shown in FIG. 5 illustrate the effect of adjusting the gate resistance R on switching losses when switching on and off, indicated in each case by $E_{ON}$ and $E_{OFF}$. The switching losses in a first case 502, in which the gate resistance is low, are lower than in a second case 503 where the gate resistance is higher. This effect may be used to adjust the junction temperature of each semiconductor device.

Figure 6:
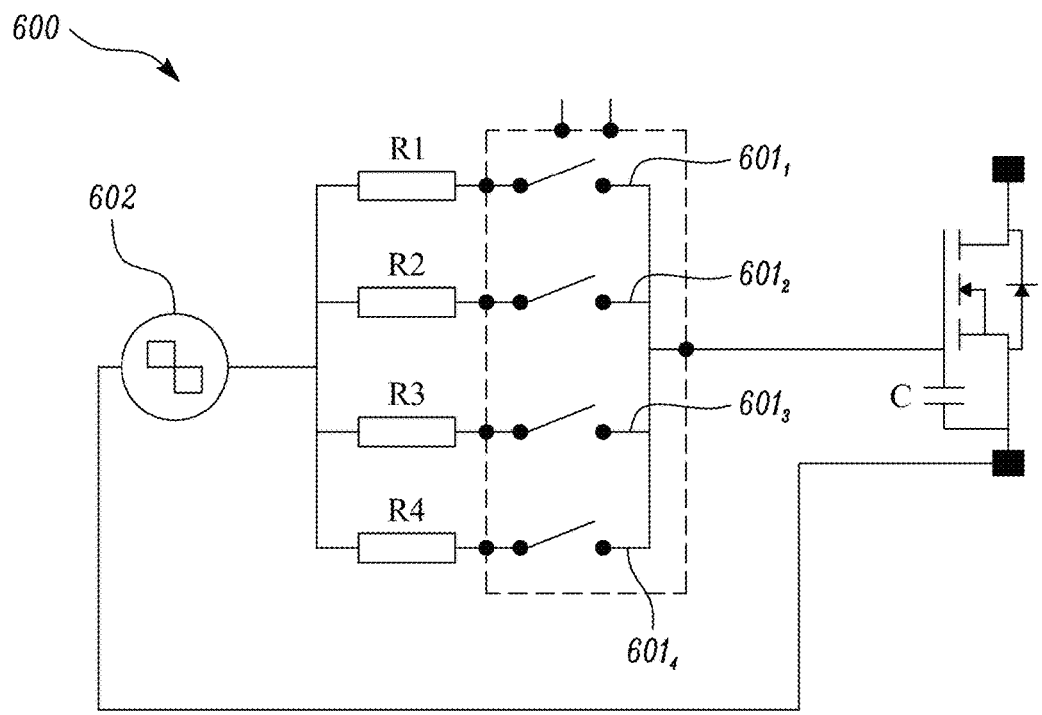
FIG. 6 is a schematic diagram illustrating a semiconductor device circuit having an adjustable gate resistance.

FIG. 6 illustrates an example circuit 600 in which the gate resistance is controllable to allow switching losses to be controlled. A plurality of resistors R1-R4 are connected to the gate of the MOSFET in parallel via respective switches $601_{1-4}$. A multiplexer logic control input signal 603 is provided to control switching of the switches $601_{1-4}$. The gate resistance of the MOSFET can thereby be controlled by controlling which resistance is connected. The number of resistors may be chosen depending on the resolution required for controlling the gate resistance.

Figure 7:
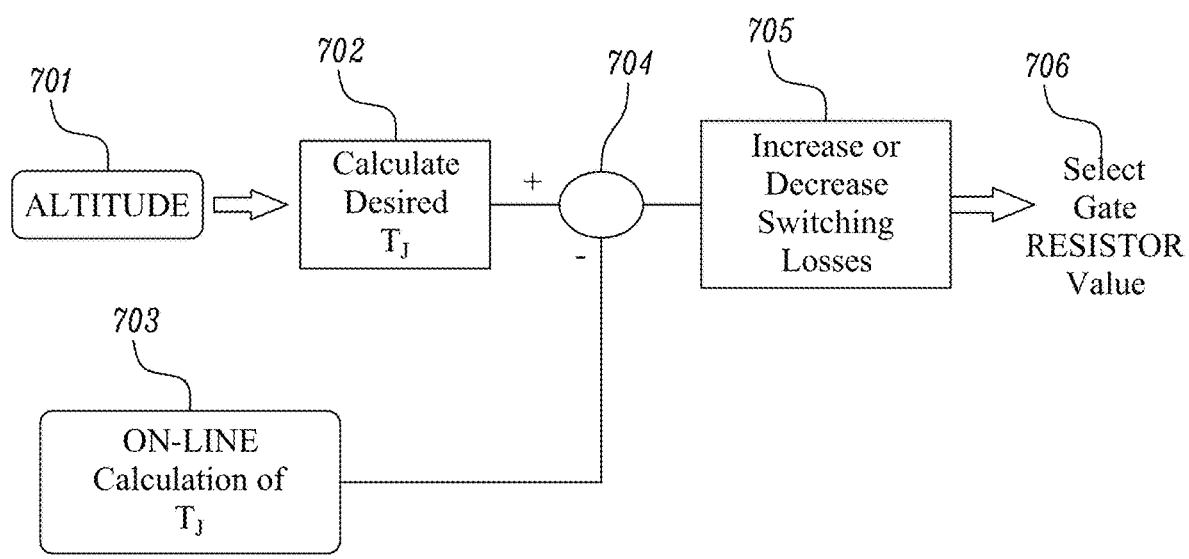
FIG. 7 is a schematic diagram illustrating a process of determining a gate resistance value dependent on an input altitude signal.

FIG. 7 illustrates schematically a process for selecting a gate resistor value in dependence on an altitude input. An altitude value 701 is input and a desired junction temperature is calculated 702. This is compared to a calculated junction temperature 703, for example from a stored look-up table. A comparison of the two values 704 is used to adjust, i.e. increase or decrease, switching losses 705 and a gate resistance value is selected 706 as a result. The process may be continuously repeated using a calculated junction temperature to maintain a desired junction temperature of each semiconductor device. A measured junction temperature may alternatively be used, but in some cases it may not be possible, or at least may be undesirably complex, to obtain such a measurement. A calculated or stored temperature may be used instead based on previous knowledge of the operating voltage, current and switching actions of the converter so that a continuous estimate of the junction temperature can be obtained. This may result in a reliable estimate of junction temperature in varying conditions. In some examples, another measurement may provide a proxy for junction temperature. For example, the threshold voltage of an insulated gate bipolar transistor (IGBT) is known to change linearly with device temperature and could therefore be used to provide a measure of junction temperature by monitoring the switching waveforms of the device.

Figure 8:
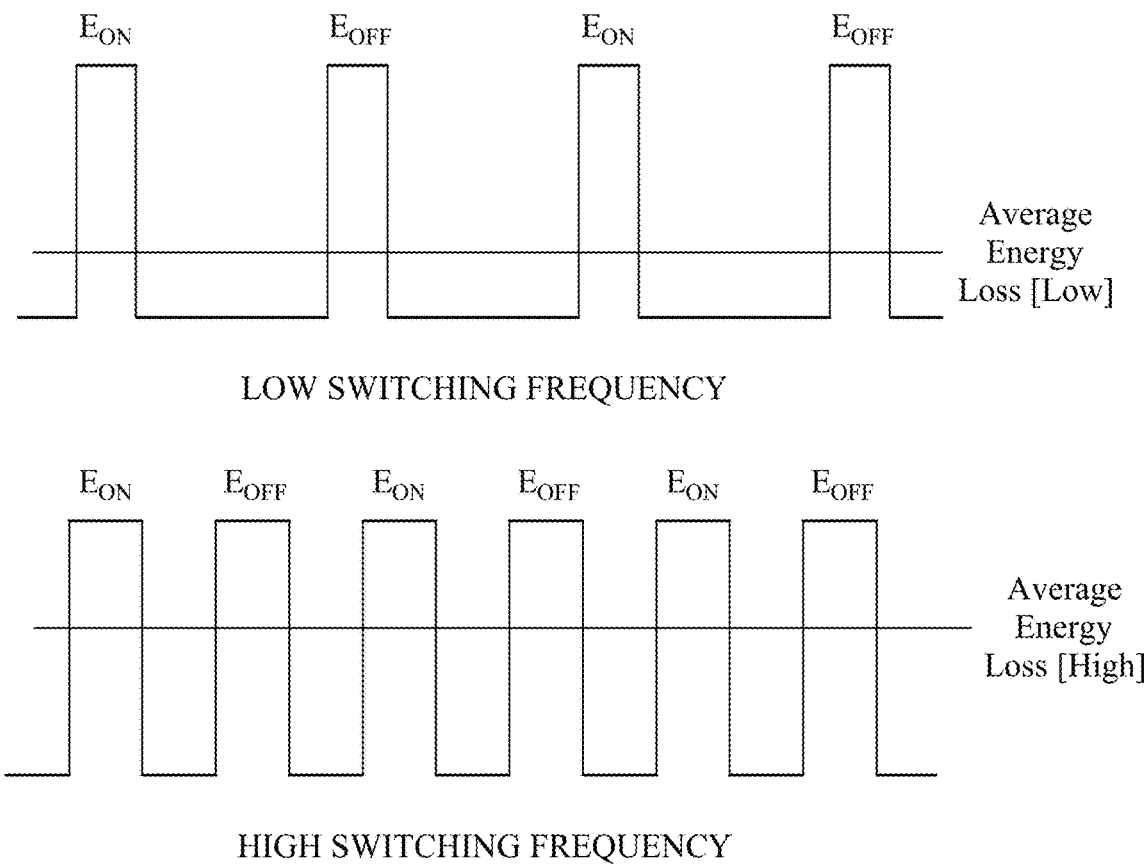
FIG. 8 illustrates the effect of low and high switching frequencies on average energy loss for a semiconductor switching circuit.

In another example, which may be used either instead of or in combination with control of the gate resistance, the switching frequency of the semiconductor devices may be adjusted to adjust switching losses and therefore control the junction temperature of the devices. FIG. 8 illustrates schematically energy losses over time for a low switching frequency and a high switching frequency. If the energy loss for each switching event is the same, increasing the frequency will increase the overall average energy losses over time, resulting in an increase in junction temperature of the device.

Figure 9:
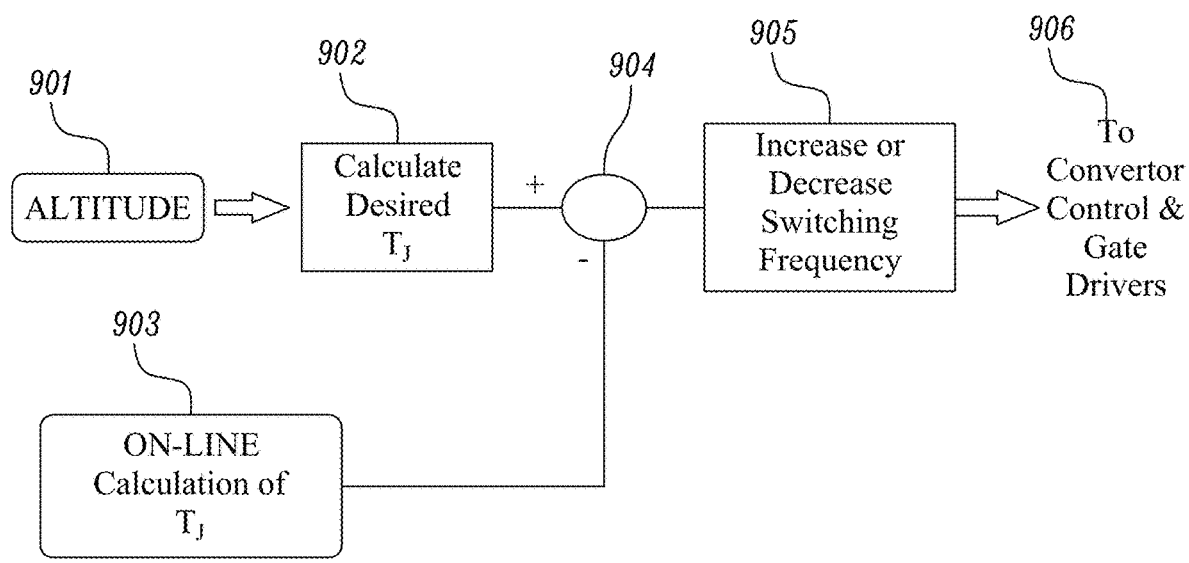
FIG. 9 is a schematic diagram illustrating a process of determining a switching frequency dependent on an input altitude signal.

FIG. 9 illustrates schematically a process for adjusting a switching frequency for controlling a junction temperature of an electrical converter. An input altitude signal 901 is provided and a desired junction temperature is calculated 902. This is compared 904 to a calculated or measured junction temperature 903 and the switching frequency is adjusted 905, i.e. increased or decreased (or maintained). A control signal 906 is provided to the converter, which controls the gate driving circuits of the semiconductor devices. The process may be operated continuously similarly to the process described above in relation to FIG. 7, using either a calculated or measured junction temperature.

Figure 10:
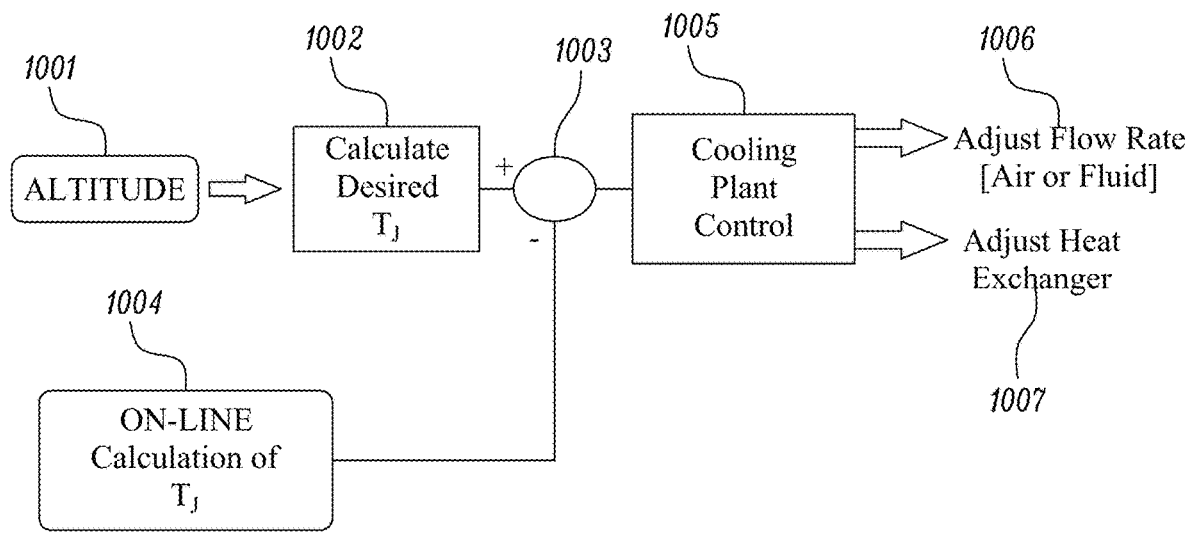
FIG. 10 is a schematic diagram illustrating a process of adjusting thermal management of an electrical converter dependent on an input altitude signal.

A further alternative method of controlling junction temperature is illustrated in FIG. 10, which may be used either separately or together with one or both of the above-described processes. In this example, the temperature of the semiconductor devices is controlled directly by control of the heating or cooling of the converter. As with FIGS. 7 and 9, an input altitude signal 1001 is provided and a desired junction temperature is calculated 1002. This is compared 1003 with a calculated or measured junction temperature 1004 and a cooling (or heating) plant control signal 1005 is determined, resulting in an adjustment of a flow rate of cooling or heating fluid 1006 or operation of a heat exchanger 1007.

For power electronic converters used in aerospace applications, cooling systems may be employed that use movement of fluid such as water or glycol to transport heat away from electronic components. For a given amount of heat dissipated by each semiconductor device, there will be a set relationship with the junction temperature. The junction temperature may for example be around 20° C. above the coolant temperature. The temperature of the coolant may be adjusted by adjusting the flow rate, thereby raising or lowering the junction temperature. A similar effect may be achieved in the case of air cooled heatsinks by adjusting a flow of air over the heatsink fins. In a general aspect therefore, the junction temperature of the semiconductor devices may be controlled by controlling a flow of cooling fluid through the converter. This method may be more suitable for SSCB (Solid State Circuit Breaker) and SSPC (Solid State Power Converter) products, which normally do not require the semiconductor devices to continually switch on an off at high frequency and are either continually conducting or turned off.

Figure 11:
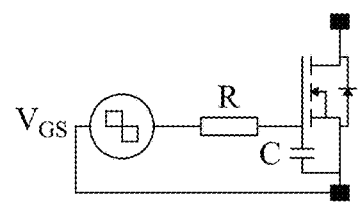
FIG. 11 is an illustration of the effect of increasing conduction losses for a SiC power MOSFET as a function of gate to source switching voltage.
Figure 11:
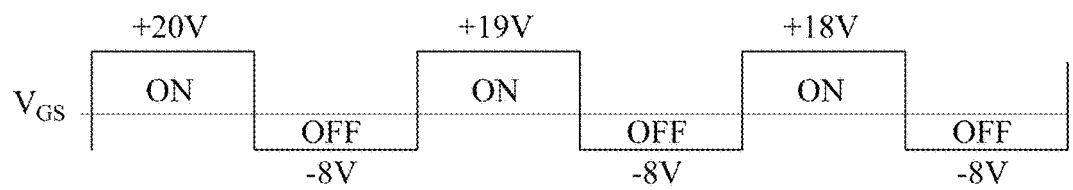
Figure 11:

Some types of semiconductor devices, for example MOSFETs based on silicon carbide, may have their junction temperature controlled by adjusting the gate-source switching voltage VGS. This is illustrated schematically in FIG. 11. As VGS is decreased, the conduction losses for the MOSFET increase. This may be used either separately or together with one or more of the above processes to control the junction temperature of the devices.

Normally power electronic converters used for AC to DC conversion are deliberately controlled to draw clean sinusoidal currents from the AC electrical machine by virtue of the applied switching pattern, for example by controlling a switching pulse width modulation (PWM) pattern. This current is preferably arranged to have no reactive or harmonic components which would circulate between the AC electrical machine and converter and generally result in additional heat losses. With such clean waveforms the converter is processing real power only and operating with maximum efficiency. In order to increase the semiconductor junction temperature it may be possible to control the converter such that the current is out of phase with the voltage (i.e. reactive power exchange) and distorted with harmonic components such that the waveform is no longer sinusoidal in shape. Both reactive current and harmonic current may be controlled by changing the semiconductor switching patterns. Although reactive current flow is known to also affect the magnitude of the alternating voltage at the terminals of the converter and harmonic currents lead to additional heating of the electrical machine and increased torque ripple at the rotating shaft, this change in the current waveform may also be used to control the semiconductor junction temperature, either alone or in combination with one or more of the above processes.

Figure 12:
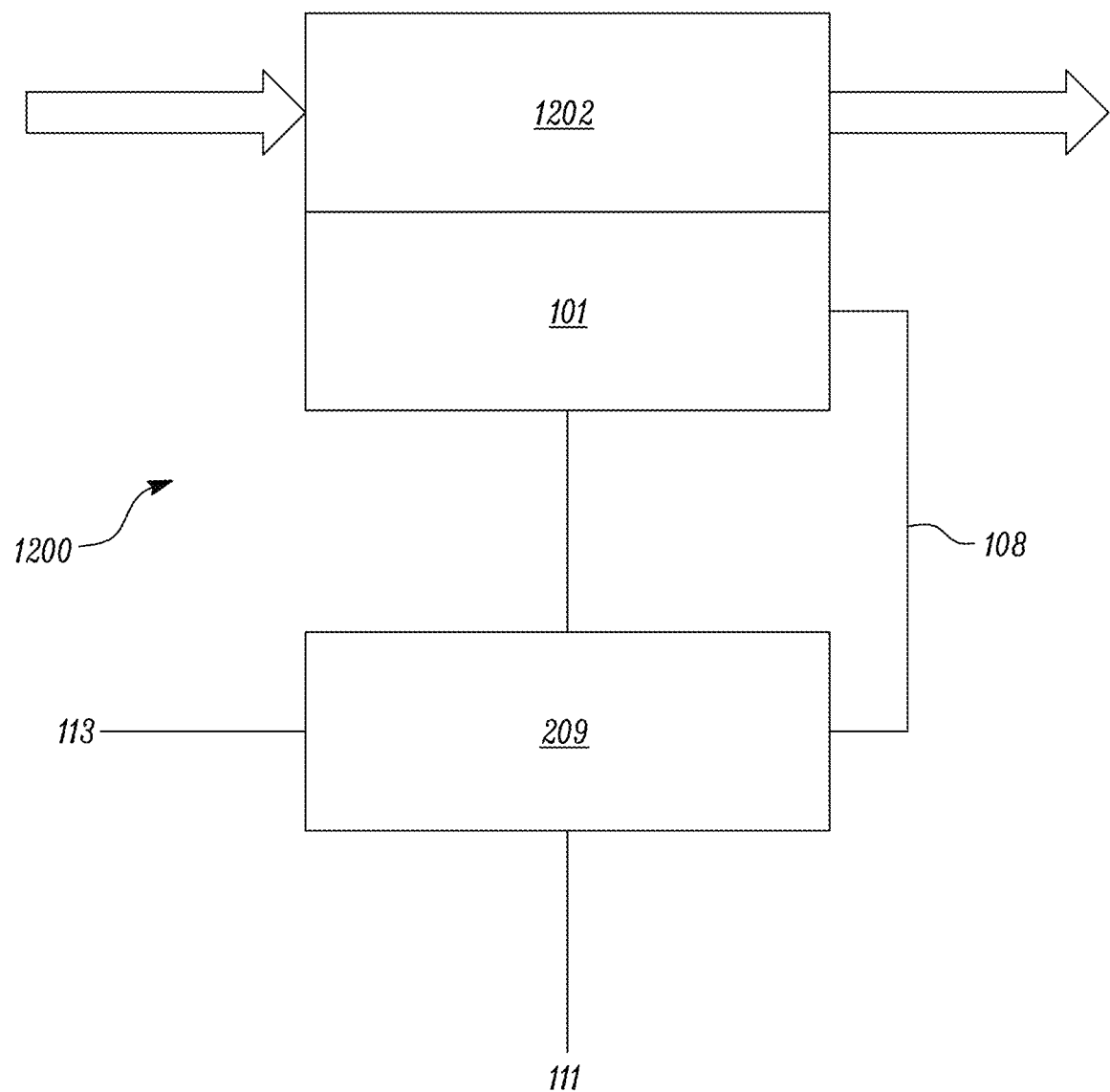
FIG. 12 is a schematic diagram of an example electrical converter with a heat exchanger connected to the converter circuit.

FIG. 12 illustrates schematically an example electrical converter 1200 comprising a controller 209 and a converter circuit 101. The electrical converter 1200 comprises a thermal management system in the form of a heat exchanger 1202 connected to the converter circuit 101 for control of the temperature of components in the converter circuit 101. A flow of fluid through the heat exchanger, which may for example be air, water or a mixture of water and glycol, may be controlled by the controller 209 to control a temperature of the converter circuit 101. As with the examples described above, the controller 206 receives an input altitude signal 113, a voltage demand signal 111 and a measured output voltage signal 108 to enable the converter circuit 101 to be controlled. In other examples the thermal management system may take a form other than a heat exchanger, for example one or more fans or other forced air systems.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

The invention claimed is:

1. An electrical converter for an aircraft, comprising:
a converter circuit having a plurality of transistors configured to convert an input electrical supply to an output electrical supply; and
a controller configured to receive an input altitude signal, wherein the controller is configured to adjust a gate resistance of each of the plurality of transistors based on the input altitude signal to control a junction temperature of the plurality of transistors according to the received input altitude signal to reduce an effect of increased incident cosmic radiation on the converter circuit,
wherein adjusting the gate resistance of each of the plurality of resistors based on the input altitude signal includes:
calculating a desired junction temperature from the input altitude signal;
comparing a calculated or measured junction temperature to the calculated desired junction temperature; and
selecting a gate resistance value based on a difference between the calculated or measured junction temperature and the calculated desired junction temperature.

2. The electrical converter of claim 1, wherein the controller is connected to the converter circuit and configured to control a switching operation of the plurality of transistors, and wherein the controller is further configured to adjust the switching operation of each of the plurality of transistors according to the received input altitude signal to control the junction temperature of each of the plurality of transistors.

3. The electrical converter of claim 2, wherein the controller is configured to control the switching operation by controlling a rate at which each transistor switches between states.

4. The electrical converter of claim 2, wherein the controller is configured to control the switching operation by adjusting a switching frequency of the plurality of transistors according to the received input altitude signal.

5. The electrical converter of claim 1, wherein the controller is configured to receive a control signal of a difference between an input voltage demand signal and a measured output voltage of the converter circuit.

6. The electrical converter of claim 1, wherein the controller is configured to control a temperature of each of the plurality of transistors by adjusting thermal management of the electrical converter dependent on the received input altitude signal.

7. The electrical converter of claim 6, comprising a heat exchanger connected to the converter circuit, wherein the controller is configured to adjust a flow rate of a cooling or heating fluid flowing through the heat exchanger.

8. The electrical converter of claim 1, wherein the converter circuit is one of an AC to DC converter, a DC to DC converter and a DC to AC converter.

9. The electrical converter of claim 1, wherein, for each one of the plurality of transistors, a plurality of resistors are connected to a gate of the transistor in parallel via a respective plurality of switches, and wherein the controller is configured to adjust the gate resistance of the transistors by controlling the switches to control which of the plurality of resistors are connected to the gate.

10. A method of controlling an electrical converter for an aircraft electrical power system, the electrical converter comprising a converter circuit having a plurality of transistors configured to convert an input electrical supply to an output electrical supply and a controller, the method comprising:
receiving, via the controller, an input altitude signal; and
adjusting a gate resistance of each of the plurality of transistors based on the input altitude signal in order to control a junction temperature of the plurality of transistors according to the received input altitude signal to reduce an effect of increased incident cosmic radiation on the converter circuit,
wherein adjusting the gate resistance of each of the plurality of resistors based on the input altitude signal includes:
calculating a desired junction temperature from the input altitude signal;
comparing a calculated or measured junction temperature to the calculated desired junction temperature; and
selecting a gate resistance value based on a difference between the calculated or measured junction temperature and the calculated desired junction temperature.

11. The method of claim 10, wherein the controller is connected to the converter circuit and controls a switching operation of the plurality of transistors, and wherein the controller adjusts the switching operation of each of the plurality of transistors according to the received input altitude signal to control the junction temperature of each of the plurality of transistors.

12. The method of claim 11, wherein the controller controls the switching operation by controlling a rate at which each transistor switches between states.

13. The method of claim 11, wherein the controller controls the switching operation by adjusting a switching frequency of the transistors according to the received input altitude signal.

14. The method of claim 10, wherein the controller receives a control signal of a difference between an input voltage demand signal and a measured output voltage of the converter circuit.

15. The method of claim 10, wherein the controller controls a temperature of each of the plurality of transistors by adjusting thermal management of the electrical converter dependent on the received input altitude signal.

16. The method of claim 15, wherein the electrical converter comprises a heat exchanger connected to the converter circuit and the controller adjusts a flow rate of a cooling or heating fluid flowing through the heat exchanger.

17. The method of claim 10, wherein the converter circuit is one of an AC to DC converter, a DC to DC converter and a DC to AC converter.

* * * * *